United States Patent
Chen et al.

(10) Patent No.: US 11,012,248 B1
(45) Date of Patent: May 18, 2021

(54) POWER OVER ETHERNET-BASED REDUNDANT POWER MANAGEMENT METHOD AND REDUNDANT POWER SUPPLY MANAGED BY THE SAME

(71) Applicant: D-Link Corporation, Taipei (TW)

(72) Inventors: Shou-Shan Chen, Taipei (TW); Yi-Jen Chiang, Taipei (TW); Jen-Hua Yeh, Taipei (TW)

(73) Assignee: D-Link Corporation, Taipei (TW)

( * ) Notice: Subject to any disclaimer, the term of this patent is extended or adjusted under 35 U.S.C. 154(b) by 0 days.

(21) Appl. No.: 16/878,571

(22) Filed: May 19, 2020

(30) Foreign Application Priority Data

Jan. 21, 2020 (TW) ................................ 10910205.7

(51) Int. Cl.
*H04B 3/00* (2006.01)
*H04L 25/00* (2006.01)
*H04L 12/10* (2006.01)
*H02J 9/06* (2006.01)

(52) U.S. Cl.
CPC .............. *H04L 12/10* (2013.01); *H02J 9/061* (2013.01)

(58) Field of Classification Search
CPC ............ H04L 12/10; H02J 9/061; G06F 1/26
USPC .......................... 375/257, 258, 219, 220, 222
See application file for complete search history.

(56) References Cited

U.S. PATENT DOCUMENTS

| | | | | |
|---|---|---|---|---|
| 2007/0110360 A1* | 5/2007 | Stanford | ............ | H04L 12/10 385/14 |
| 2010/0052421 A1* | 3/2010 | Schindler | ............ | G06F 1/26 307/35 |

FOREIGN PATENT DOCUMENTS

| | | |
|---|---|---|
| TW | 200538913 A | 12/2005 |
| TW | 200625865 A | 7/2006 |

\* cited by examiner

*Primary Examiner* — Phuong Phu
(74) *Attorney, Agent, or Firm* — CIPO IP Group

(57) ABSTRACT

A power over Ethernet (PoE)-based redundant power management method manages a redundant power supply electrically connectable to plural network devices through plural twisted pairs respectively, so as to transmit first electricity and digital information to each network device. The redundant power supply receives a power demand message from, and is informed of the electric power needed by, each network device electrically connected to the redundant power supply. In response to determining the second electricity each such network device has been receiving is interrupted, the redundant power supply outputs to each such network device the corresponding first electricity equal to the electric power needed by the network device through a corresponding Ethernet port. In response to receiving a power-off request message from any such network device, the redundant power supply stops outputting to that network device the corresponding first electricity.

24 Claims, 8 Drawing Sheets

POWER OVER ETHERNET-BASED REDUNDANT POWER MANAGEMENT METHOD AND REDUNDANT POWER SUPPLY MANAGED BY THE SAME

CROSS-REFERENCE TO RELATED PATENT APPLICATION

This non-provisional application claims priority to and the benefit of, under 35 U.S.C. § 119(a), Taiwan Patent Application No. 109102057, filed in Taiwan on Jan. 21, 2020. The entire content of the above identified application is incorporated herein by reference.

FIELD

The present disclosure relates to a redundant power supply, and more particularly, to a redundant power supply and a management method thereof that are based on the Power over Ethernet (PoE) technology and provide each network device electrically connected to the redundant power supply with the electricity needed, based on the electric power of the network device.

BACKGROUND

"Redundant power" refers to the electricity supplied by either of the two power sources that are used to supply electricity to an electricity-receiving device in an alternative manner, and that are configured to take over the duty of each other immediately after either one malfunctions. For instance, the electricity-receiving device (e.g., a network switch, router, or other network device) is electrically connected to an alternating-current (AC) power supply system and a redundant power supply, and when the electricity-receiving device cannot receive the electricity transmitted from the AC power supply system, the redundant power supply will provide electricity to the electricity-receiving device to ensure proper continuous operation of the electricity-receiving device.

A conventional redundant power supply uses a power line to transmit electricity to an electricity-receiving device, and must be provided with an additional signal line in order to transmit digital or analog signals to the electricity-receiving device as well. The design of the power line and the signal line, therefore, must take into account the interface design of the redundant power supply and of the backup port of the electricity-receiving device. As the power line and the signal line in most cases are transmission lines of custom-made specifications, if the backup port of an electricity-receiving device serving as a replacement is different from that of the existing electricity-receiving device and hence incompatible with the existing transmission lines, the device owner has to replace either the electricity-receiving device meant to be the replacement or the transmission lines, either of which can incur a considerable cost.

Moreover, as the power line and the signal line of a conventional redundant power supply are separate transmission lines, the connectors accommodated for such are generally quite bulky and take up a large amount of space on the circuit board of the conventional redundant power supply. In addition, while a user is making connections to the connectors, an improper wire insertion angle may cause poor contact and thus hinder normal operation of the conventional redundant power supply. Also, most of the conventional redundant power supplies are designed to provide backup support to only one electricity-receiving device at a time and cannot be expanded into a one-to-many backup configuration. Therefore, if a plurality of electricity-receiving devices need backup support, the device user has to prepare the same number of redundant power supplies, which can not only impose a great financial burden on the user, but also raise issues as to placement of the redundant power supplies.

Furthermore, in terms of power supply management, a conventional redundant power supply can only be activated through passive voltage detection and then supply backup electricity to an electricity-receiving device. Therefore, after a conventional redundant power supply is activated, if the electric power needed by the electricity-receiving device in question turns out to be higher than the total power of the conventional redundant power supply, the conventional redundant power supply will not work, i.e., will not provide any backup support. Besides, when a conventional redundant power supply malfunctions, it will not notify the user, so the user will be left unaware of the fact that the backup system composed of the redundant power supply has lost its backup function.

The issue to be addressed by the present disclosure is to improve the conventional redundant power supplies and thereby solve the foregoing problems.

SUMMARY

In view of the various technical inadequacies of the conventional redundant power supplies and of backup systems composed of the same, based on years of practical experience in the network device industry, including the professional knowledge and skills accumulated over those years, extensive research, and repeated experiments and improvements, the present disclosure provides a PoE-based redundant power management method and a redundant power supply managed by the same that are to solve the aforesaid technical inadequacies effectively and provide better user experience and greater ease of use.

One aspect of the present disclosure is directed to a PoE-based redundant power management method for use on a redundant power supply. The redundant power supply is connectable electrically to a plurality of network devices through a plurality of twisted pairs respectively to transmit first electricity and digital information to each of the network devices. The redundant power supply includes a plurality of Ethernet ports, a backup power supply unit and a microcontroller. Each of the Ethernet port is electrically connectable to a corresponding one of the network devices through a corresponding one of the twisted pairs so as to enter an online state and transmit the corresponding first electricity and the corresponding digital information to the corresponding network device. The backup power supply unit is electrically connected to each of the Ethernet ports respectively and configured to output the corresponding first electricity to a corresponding one of the Ethernet ports. The microcontroller is electrically connected to the backup power supply unit and configured to receive a power demand message from each of the network devices so as to be informed of electric power needed by the network device. The method includes the steps of in response to determining, by the microcontroller, that second electricity for at least one of the network devices that is electrically connected to the redundant power supply is interrupted, outputting, by the backup power supply unit, the corresponding first electricity needed by the network device through the corresponding Ethernet port, in which the corresponding first electricity equals to the electric power needed by the network device. The method further includes in response to receiving, by the microcontroller, a power-off request message from the network device, stopping, by the backup power supply unit, outputting the corresponding first electricity to the network device. Accordingly, by using the PoE technology and twisted pairs to transmit digital signals as well as electricity, simultaneous transmission of data and electricity, as well as the configuration of a single redundant power supply supporting a plurality of connected network devices can be realized.

Another aspect of the present disclosure is directed to a redundant power supply for PoE-based redundant power management. The redundant power supply is connectable electrically to a plurality of network devices through a plurality of twisted pairs respectively to transmit first electricity and digital information to each of the network devices. The redundant power supply includes a plurality of Ethernet ports, a backup power supply unit and a backup power supply unit. Each Ethernet port is electrically connectable to a corresponding one of the network devices through a corresponding one of the twisted pairs so as to enter an online state. The Ethernet port is configured to transmit the corresponding first electricity and the corresponding digital information to the corresponding network device, and receive a power demand message from the network device. The backup power supply unit is electrically connected to each of the Ethernet ports respectively and configured to output the corresponding first electricity to a corresponding one of the Ethernet ports. The microcontroller is electrically connected to the backup power supply unit. The microcontroller is configured to receive the power demand message so as to be informed of electric power needed by the network device. The microcontroller is further configured to, in response to determining, by the microcontroller, that second electricity for at least one of the network devices that is electrically connected to the redundant power supply is interrupted, instruct the backup power supply unit to output corresponding first electricity needed by the at least one network device through a corresponding Ethernet port, in which the corresponding first electricity equals to the electric power needed by the network device. The microcontroller is further configured to, in response to receiving, by the microcontroller, a power-off request message from the network device, stop outputting the corresponding first electricity to the network device. Accordingly, the redundant power supply provides each network device electrically connected to the redundant power supply with the first electricity needed by the network device according to the electric power of the network device. Further, a more stable network environment is created as the cost of wiring can be reduced by the use of the PoE technology.

BRIEF DESCRIPTION OF THE DRAWINGS

The present disclosure will become more fully understood from the following detailed description and accompanying drawings.

DETAILED DESCRIPTION

Figure 1:
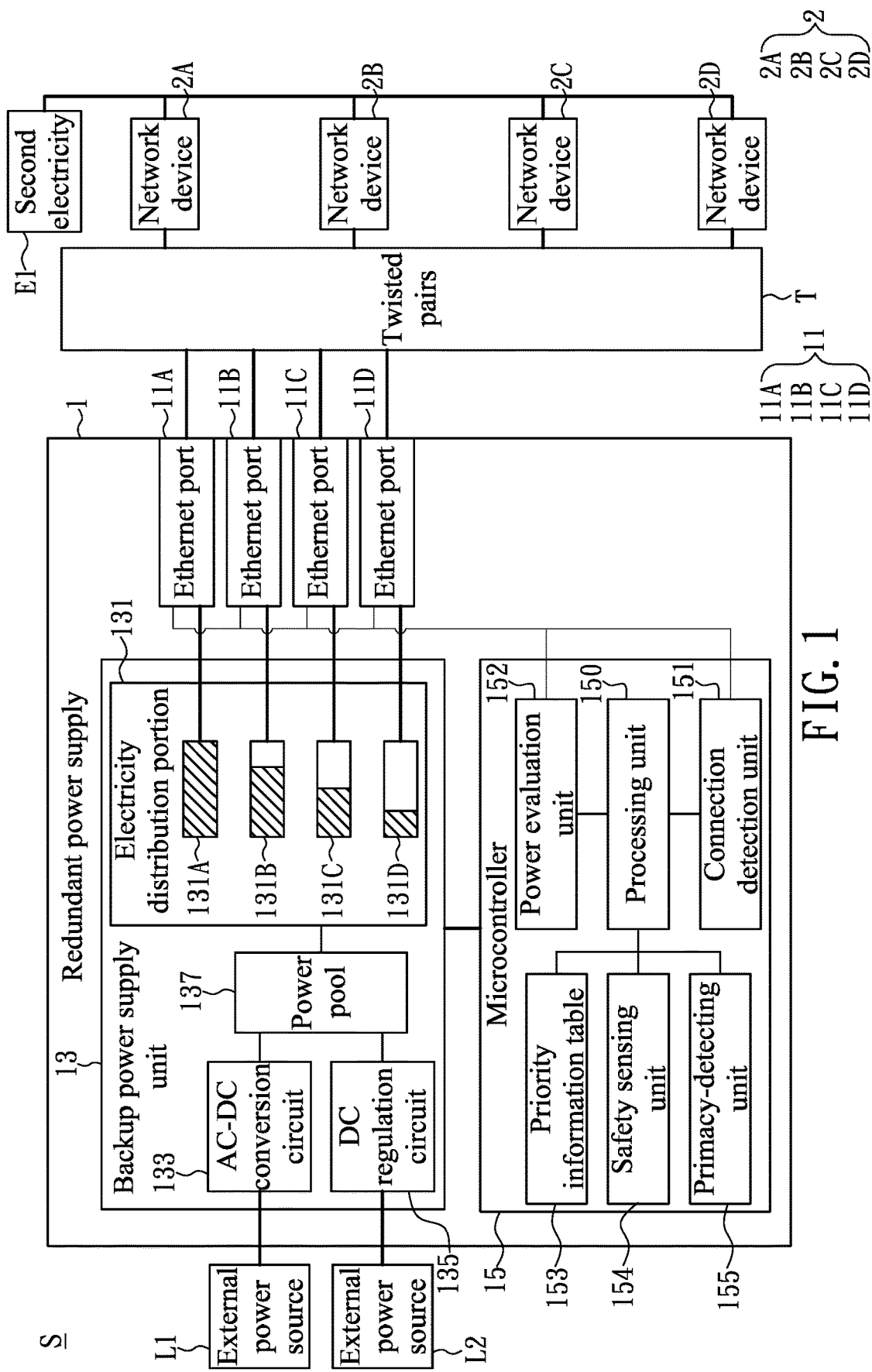
FIG. 1 is a hardware diagram of the components of the redundant power supply being shown in detail according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, parts or the like, which are for distinguishing one component/part from another one only, and are not intended to, nor should be construed to impose any substantive limitations on the components, parts or the like.

Figure 2:
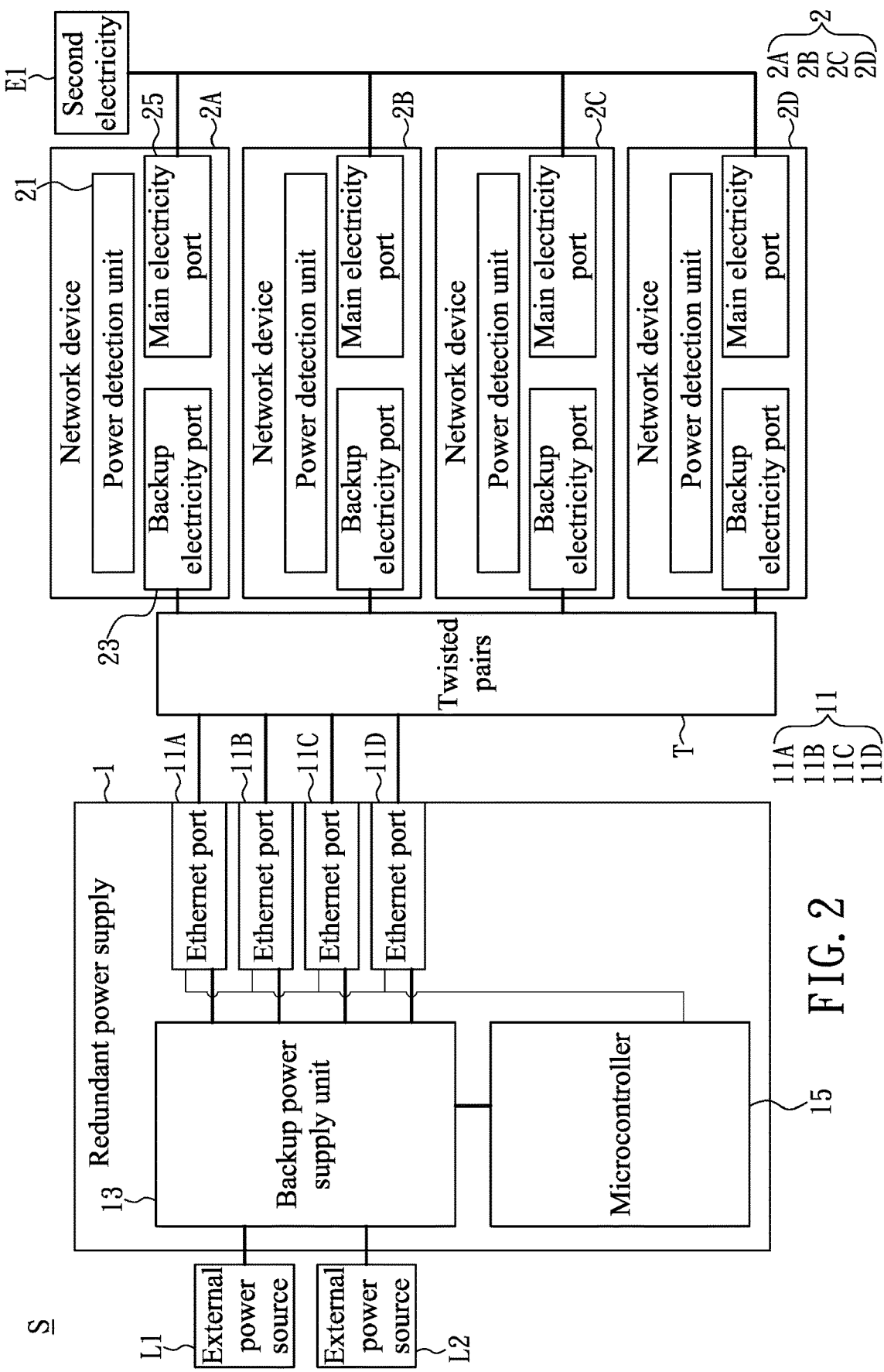
FIG. 2 is a hardware diagram of the components of the network devices being shown in detail according to the present disclosure.

The present disclosure includes applying the PoE technology, which allows electricity to be transmitted along with data in an Ethernet network through a twisted pair, to redundant power. Referring to FIG. 1 and FIG. 2, the present disclosure provides a PoE-based redundant power management method and a redundant power supply managed by the same. In certain embodiments, a backup system S includes one or a plurality of redundant power supplies 1. The redundant power supply 1 can be electrically connected to a plurality of network devices 2 (each of which may be a network switch, a router, a server, or the like) via one or a plurality of twisted pairs T (e.g., of the CAT 5/5e specifications) respectively. The redundant power supply 1 can transmit first electricity and digital information through the twisted pair(s) T to each network device 2 by using the PoE technology. Therefore, the redundant power supply 1 can not only provide backup electricity, but also transmit digital information to, and receive digital information from, each network device 2 via the same wire. Further, as the port interface of the twisted pair(s) T is nowadays generally based on the RJ45 specifications, and therefore has a smaller volume, the twisted pair(s) T and the component(s) of the backup system S connected to the twisted pair(s) T can be arranged with ease, and the configuration of a single redundant power supply 1 managing a plurality of connected network devices 2 can be realized.

Figure 3:
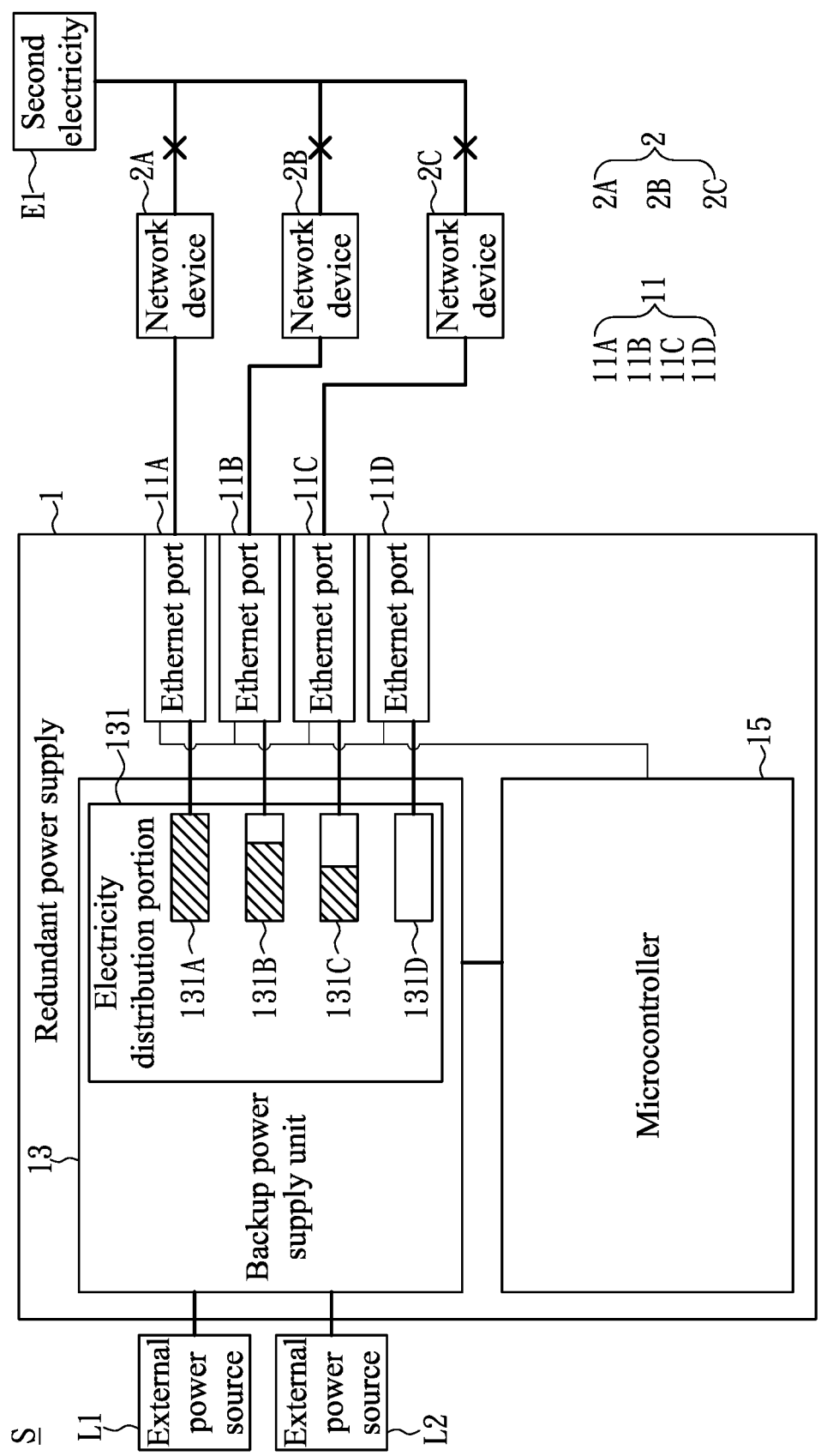
FIG. 3 is a schematic view of the network devices 2A, 2B and 2C being in the online state with the redundant power supply.

Referring to FIG. 1, four network devices 2 (namely, 2A, 2B, 2C, and 2D) are shown therein. However, the present disclosure is not limited thereto. In certain embodiments, the redundant power supply 1 may be provided with a plurality of Ethernet ports 11 (e.g., 11A, 11B, 11C, and 11D), each configured to be plugged in with a corresponding one of the twisted pair(s) T, with only some of the Ethernet ports 11 being each electrically connected to a network device 2 during use, as shown in FIG. 3. When the redundant power supply 1 is able to transmit electricity and digital information to a certain network device 2, the redundant power supply 1 and the network device 2 are defined as in the "online" state. When the redundant power supply 1 is unable to transmit electricity and digital information to a certain network device 2, the redundant power supply 1 and the network device 2 are defined as in the "offline" state. For example, the Ethernet port 11D in FIG. 3 is in the offline state.

In certain embodiments, referring again to FIG. 1 and FIG. 2, each network device 2 is provided with a power detection unit 21, a backup electricity port 23, and a main electricity port 25. The power detection unit 21 is configured to detect the highest consumed power of the network device 2, and generate, and transmit to the redundant power supply 1, a power demand message that corresponds to the detected highest consumed power. The backup electricity port 23 is configured to be connected, either directly or indirectly, to a corresponding Ethernet port 11 through a corresponding one of the twisted pair(s) T, so as to receive first electricity from the redundant power supply 1 through the corresponding one of the twisted pair(s) T and to transmit the power demand message to the redundant power supply 1 through the corresponding one of the twisted pair(s) T. The main electricity port 25 is configured to receive second electricity E1 (e.g., electricity from a wall socket) to sustain normal operation of the network device 2. In normal conditions, each network device 2 uses the second electricity E1 as its main driving power.

Referring to FIG. 1, the redundant power supply 1 includes a plurality of Ethernet ports 11, a backup power supply unit 13, and a microcontroller 15. Each Ethernet port 11 is configured to be electrically connected to one of the network devices 2 through a corresponding one of the twisted pair(s) T, so as to transmit to the network device 2 the corresponding first electricity and digital information when in the "online" state. The backup power supply unit 13 is electrically connected to each Ethernet port 11 respectively in order to output the first electricity that corresponds to a corresponding network device 2 to a corresponding Ethernet port 11. In certain embodiments, the backup power supply unit 13 is provided therein with an electricity distribution portion 131 configured to distribute among the Ethernet ports 11 electric power needed by each of the Ethernet ports 11. That is to say, in addition to distributing electric power evenly to each Ethernet port 11 and thereby allowing each Ethernet port 11 to output the same first electricity, the electric power can also be allocated to each Ethernet port 11 according to the electricity demand of the corresponding network device 2 such that the first electricity outputted by one Ethernet port 11 may be different from the first electricity outputted by another. For example, the hatched portions of the first-electricity meters 131A, 131B, 131C, and 131D in FIG. 1 indicate the electric power of the first electricity to be outputted by the Ethernet ports 11 respectively. However, the configurations of the first-electricity meters 131A, 131B, 131C, and 131D in FIG. 1 serve only to facilitate description and illustrate the concept of electric power distribution, and the present disclosure is not limited thereto.

In certain embodiments, with continued reference to FIG. 1, the redundant power supply 1 is configured to receive electricity from two external power sources L1 and L2. The electricity received is used to power the components of the redundant power supply 1 and as backup electricity for the network devices 2. The external power source L1 may be an AC power source (e.g., a wall socket) while the external power source L2 may be a direct-current (DC) power source (e.g., a battery). In normal conditions, the redundant power supply 1 can use the external power source L1 as its main power source, i.e., operation of the redundant power supply 1 is supported by the external power source L1. When the redundant power supply 1 cannot receive electricity from the external power source L1 (e.g., during a power outage), the redundant power supply 1 uses instead the external power source L2 to support normal operation of the redundant power supply 1. In certain embodiments, the redundant power supply 1 may be configured to receive electricity from only one external power source (i.e., L1 or L2) or from more than two external power sources.

In certain embodiments, as shown in FIG. 1, the backup power supply unit 13 is provided therein with an AC-DC conversion circuit 133, a DC regulation circuit 135, and a power pool 137. The AC-DC conversion circuit 133 is configured to convert the AC electricity transmitted from the external power source L1 into DC electricity, and output the DC electricity to the power pool 137 for use by the redundant power supply 1 to support operation of the redundant power supply 1 and serve as backup electricity for the network devices 2. The DC regulation circuit 135 is configured to regulate (e.g., increase or decrease) the voltage of the DC electricity transmitted from the externa power source L2, and output the regulated DC electricity to the power pool 137 for use by the redundant power supply 1 to support operation of the redundant power supply 1 and serve as backup electricity for network devices 2. The power pool 137 defines the total power of the electricity the redundant power supply 1 can supply to the network devices 2, and is electrically connected to the electricity distribution portion 131 in order for the electricity distribution portion 131 to distribute to each Ethernet port 11 the electric power needed by the Ethernet port 11.

With continued reference to FIG. 1, the microcontroller 15 is respectively electrically connected to the backup power supply unit 13 and each Ethernet port 11, and is configured to transmit information to and receive information (e.g., power demand message) from each Ethernet port 11. In certain embodiments, the microcontroller 15 is provided therein with a processing unit 150, at least one connection detection unit 151, and a power evaluation unit 152. It is noted that in certain embodiments, the aforesaid units are not necessarily located inside the microcontroller 15 as shown FIG. 1. The microcontroller 15 may be provided therein only with the processing unit 150, while other units (e.g., the connection detection unit 151 and the power evaluation unit 152) may be configured as separate chips or circuits that are not integrated into the microcontroller 15, provided that the processing unit 150 can obtain information from each of those separately provided units and perform the functions as described further below, and such a processing unit 150 still falls in the scope defined by the microcontroller 15 of the present disclosure.

With continued reference to FIG. 1, the at least one connection detection unit 151 is configured to detect the connection state (e.g., "online" or "offline") of each Ethernet port 11 and transmit the detection result to the processing unit 150, so as to inform the processing unit 150 about whether the Ethernet port 11 is connected to a network device 2 (i.e., in the online state), and therefore the processing unit 150 can refrain from instructing for supplying electricity (i.e., outputting corresponding first electricity) to an offline Ethernet port 11 during backup operation of the redundant power supply 1. In certain embodiments, the at least one connection detection unit 151 is configured to detect each Ethernet port 11 with a very small current, e.g., using technical means such as a port detection circuit, in order to inform the processing unit 150 about whether the Ethernet port 11 is currently in the online or offline state. The power evaluation unit 152 is configured to calculate the respective electric power of the respective first electricity needed to be provided by respective Ethernet ports 11. In certain embodiments, the microcontroller 15 (or more particularly, the processing unit 150) is informed of the respective electric power needed by, and the respective Ethernet port(s) 11 connected to, the respective network device(s) 2 by receiving the power demand message of the network device 2 from the network device 2. After the microcontroller 15 is informed of such, the power evaluation unit 152 calculates the respective electric power needed to be provided by the respective Ethernet port(s) 11, the microcontroller 15 (or more particularly, the processing unit 150) instructs the electricity distribution portion 131 to adjust the respective first electricity to be outputted to the respective network device(s) 2 to the extent that matches the respective electric power needed by the respective network device(s) 2 (e.g., as indicated by the first-electricity meters 131A, 131B, 131C, and 131D).

Referring again to FIG. 1 and FIG. 2, when the network devices 2 can receive the second electricity E1, the second electricity E1 is used as the main driving power to support operation of the network devices 2. In the meantime, the Ethernet ports 11 are in the standby mode and do not output any first electricity. In response to the microcontroller 15 determining that the second electricity E1 is interrupted, the microcontroller 15 instructs the backup power supply unit 13 to output to the respective network devices 2 the corresponding first electricity (i.e., the respective first electricity needed by the respective network devices 2) through the corresponding Ethernet ports 11, in order to sustain normal operation of the network devices 2. The microcontroller 15 determines whether the second electricity E1 is interrupted through the procedures such as those described as follows. In certain embodiments, a network device 2 may transmit a backup request message to the redundant power supply 1 (or more particularly, to the microcontroller 15). In certain embodiments, the redundant power supply 1 (or more particularly, the microcontroller 15) may detect the availability/unavailability of the second electricity E1. In response to the second electricity E1 being restored, the network device 2 transmits a power-off request message to the redundant power supply 1 (or more particularly, to the microcontroller 15), and upon receiving the power-off request message from any network device 2, the redundant power supply 1 (or more particularly, the microcontroller 15) instructs the backup power supply unit 13 to stop outputting to the network devices 2 the corresponding first electricity, and bring the Ethernet ports 11 back to the standby mode until the second electricity E1 is interrupted again.

As the network devices 2 may differ in performance, the electric power needed by one network device 2 may be different from that needed by another. If the sum of the electric power needed by all the network device(s) 2 is higher than the total power of the backup power supply unit 13 (or more particularly, of the power pool 137) at which the backup power supply unit 13 can supply to the network device(s) 2, the redundant power supply 1 can output the first electricity preferentially to network device(s) 2 with high-importance level, so as to avoid the output power from exceeding the rated power (total power), and breakdown of the backup system S. To achieve such effects, referring again to FIG. 1, the microcontroller 15 may be provided therein with a priory information table 153 that records the level of priority of each Ethernet port 11 and/or of each network device 2. The levels of priority can be set in different exemplified ways as follows.

A1: A user may set the level of priory of each Ethernet port 11 manually via an operation interface provided by the redundant power supply 1 or by a terminal device (e.g., a smartphone or a desktop computer). As the levels of priority of the Ethernet ports 11 are set, the network device 2 connected to a particular Ethernet port 11 will have the corresponding level of priority. For example, if the levels of priority of the Ethernet ports 11A to 11D are set as 11A>11B>11C>11D, the network device 2A connected to the Ethernet port 11A will have a higher level of priority than the network device 2C connected to the Ethernet port 11C.

A2: A user may set the level of priory of each network device 2 manually via the operation interface provided by the redundant power supply 1 or by a terminal device (e.g., a smartphone or a desktop computer). Once the level of priory of a particular network device 2 is set, no matter the network device 2 is connected to any one of the Ethernet ports 11, the level of priority of this particular network device 2 is not affected or changed thereby.

A3: The redundant power supply 1 may be configured to set the level of priority of each network device 2 automatically. For example, the redundant power supply 1 may be configured to identify the type of each network device 2 by the ONVIF standard or other protocols, and then set the level of priority of each network device 2 according to the default importance level of a network device 2. In certain embodiments, the redundant power supply 1 may be configured to set the level of priority of each network device 2 according to the power consumption, order of connection, and/or other properties of the network device 2.

Therefore, the redundant power supply 1 can, after the backup system S is active, proactively calculate the electric power needed by all the network device(s) 2 connected to the redundant power supply 1, and then determine whether the needed electric power exceeds the total power that the redundant power supply 1 can provide to the network device(s) 2. In response to determining that the sum of the electric power needed by all the network device(s) 2 is higher than the total power of the backup power supply unit 13 (or more particularly, of the power pool 137) that the backup power supply unit 13 can supply to the network device(s) 2, the redundant power supply 1 provides corresponding first electricity preferentially, based on the contents of the priory information table 153, to each of those network device(s) 2 that are of relatively high levels of priority, and the network device(s) 2 of relatively low levels of priority do not receive their respective corresponding first electricity.

In certain embodiments, the redundant power supply 1 is configured to transmit to each of the network device(s) 2 already in the online state the corresponding first electricity, based on the priority level(s) of the network device(s) 2. In certain embodiments, the redundant power supply 1 is configured to supply, based on the level(s) of priority, to a new network device 2 that is newly connected to the redundant power supply 1 the corresponding first electricity during the backup operation of the redundant power supply 1 for the network device(s) 2 already connected to the redundant power supply 1.

Figure 4:
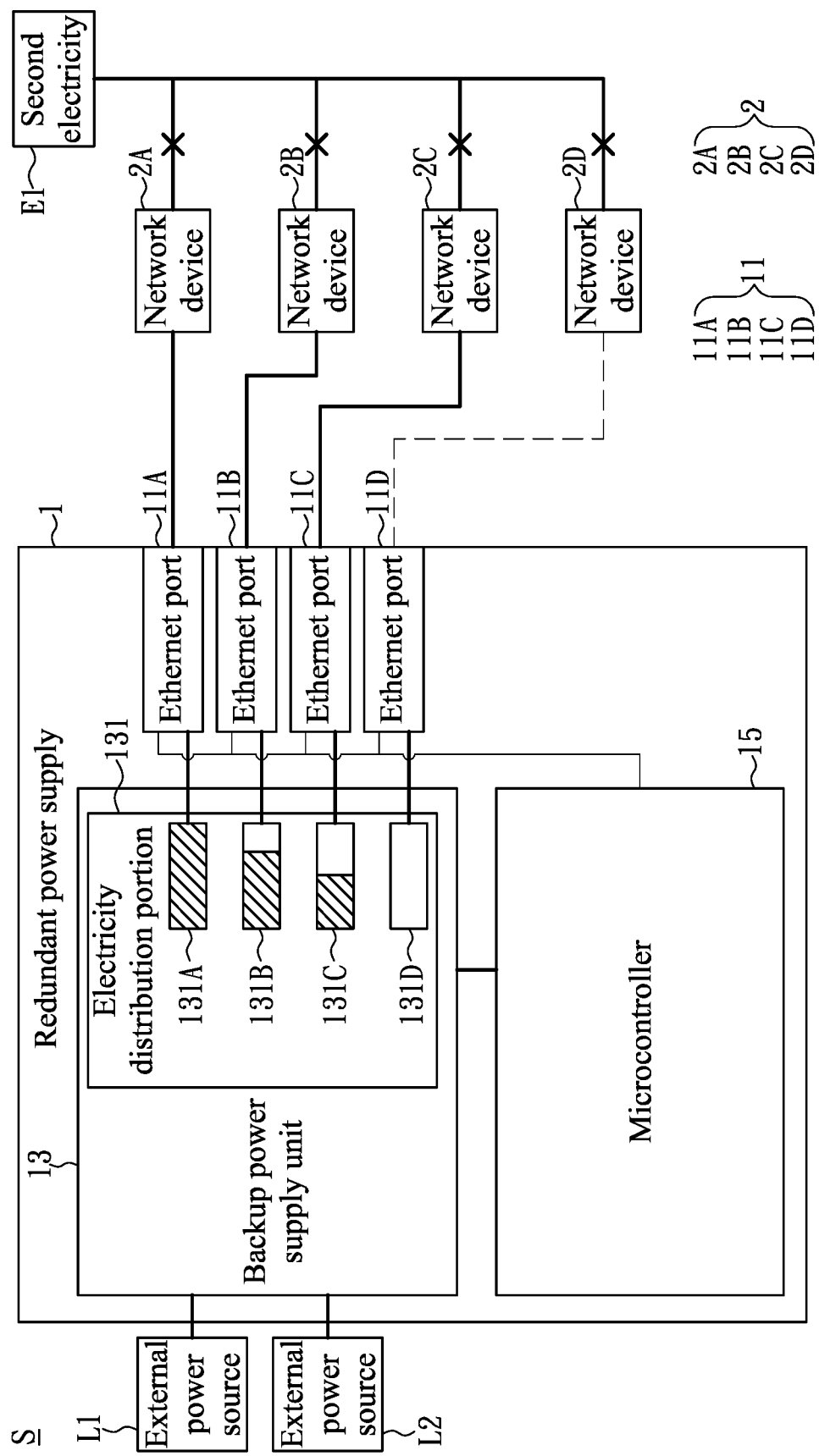
FIG. 4 is a schematic view of the network device 2D having been stopped electricity supply.
Figure 5:
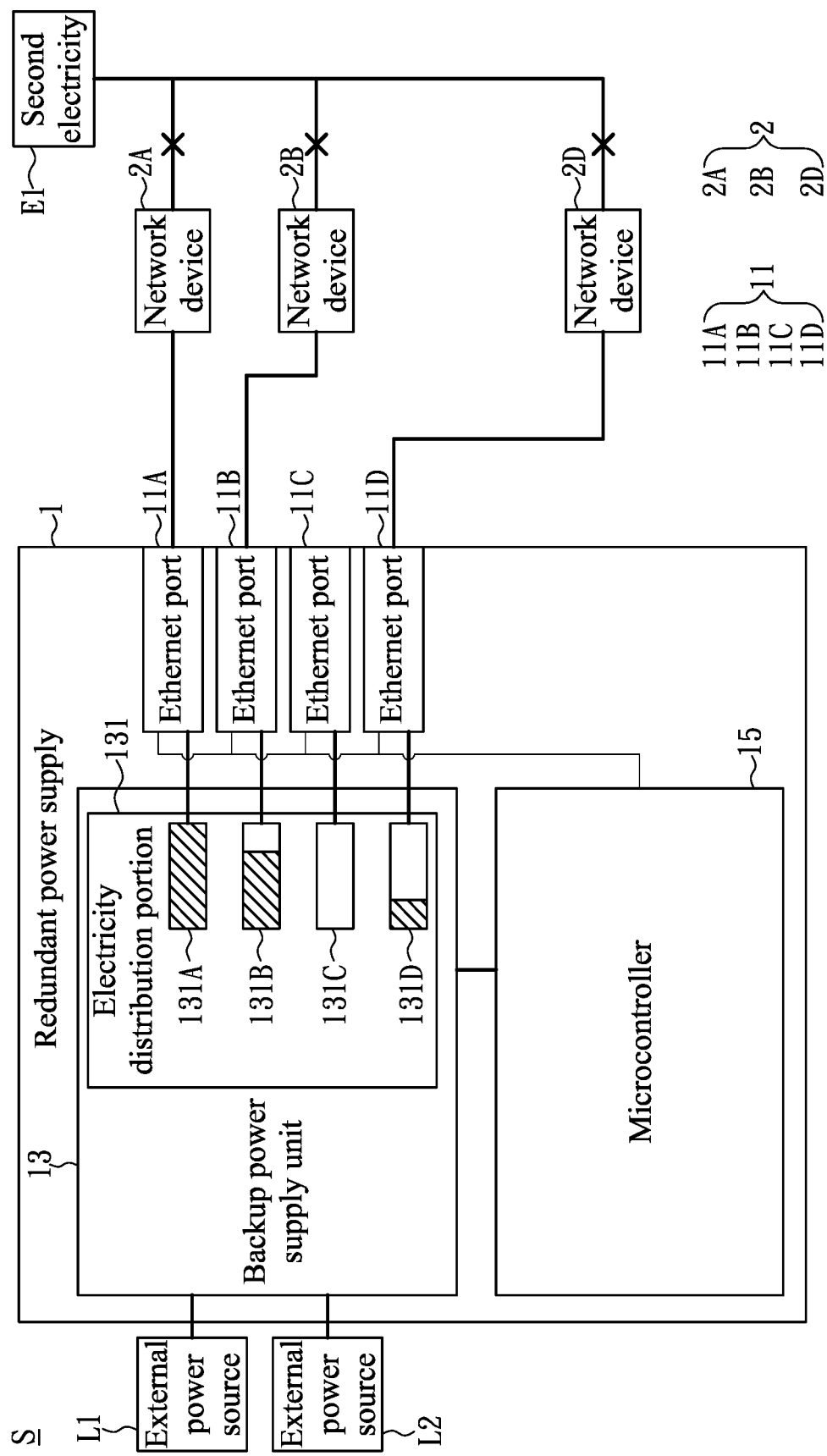
FIG. 5 is a schematic view of the network devices 2A, 2B and 2D being in the online state with the redundant power supply.

Referring to FIG. 3 to FIG. 5 (in which some components of the redundant power supply 1 are omitted for the sake of simplicity, while the structure of the redundant power supply 1 remains the same as depicted in FIG. 1), the redundant power supply 1 is in the online state with the network devices 2A, 2B, and 2C, and outputs to each of the network devices 2A, 2B, and 2C the corresponding first electricity when the second electricity E1 is no longer supplied. Referring to FIG. 4, when a new network device 2D is connected to the Ethernet port 11D and thus enters the online state during backup operation of the redundant power supply 1, the microcontroller 15 reads the electric power needed by the new network device 2D and the level of priority corresponding to the new network device 2D. In response to determining, by the microcontroller 15, that the total power at which the backup power supply unit 13 can supply electricity to the network devices 2 is higher than or equal to the sum of the electric power needed by the network devices 2A, 2B, 2C, and 2D, the microcontroller 15 instructs the backup power supply unit 13 to output to the new network device 2D the corresponding first electricity through the Ethernet port 11D. In response to determining, by the microcontroller 15, that the total power at which the backup power supply unit 13 can supply electricity to the network devices 2 is lower than the sum of the electric power needed by the network devices 2A, 2B, 2C, and 2D, the microcontroller 15 retrieves and compares the levels of priority of the network devices 2A, 2B, 2C, and 2D. In response to determining the new network device 2D has the lowest level of priority, the redundant power supply 1 does not output to the new network device 2D the corresponding first electricity (as indicated by the dashed line in FIG. 4). It is noted that the determination of "the lowest level of priority" is made based on comparing the level of priority of the new network device(s) with the level(s) of priority of all the network device(s) 2 currently receiving the respective corresponding first electricity, and not with that of any network device 2 that does not receive first electricity.

In certain embodiments, as shown in FIG. 5, the redundant power supply 1 is in the online state with the network devices 2A, 2B, and 2D, and outputs to each of the network devices 2A, 2B, and 2D the corresponding first electricity when the second electricity E1 is no longer supplied. In response to a new network device 2C being connected to the Ethernet port 11C and thus entering the online state during backup operation of the redundant power supply 1, referring again to FIG. 4, the microcontroller 15 reads the electric power needed by the new network device 2C and the level of priority corresponding to the new network device 2C. In response to determining, by the microcontroller 15, that the total power at which the backup power supply unit 13 can supply electricity to the network devices 2 is lower than the sum of the electric power needed by the network devices 2A, 2B, 2C, and 2D, the microcontroller 15 retrieves and compares the levels of priority of the network devices 2A, 2B, 2C, and 2D. In response to determining the level of priority of the new network device 2C is not the lowest, the redundant power supply 1 outputs to the new network device 2C the corresponding first electricity, and, sequentially in an order of priority level from low to high, stops supplying electricity to the Ethernet port(s) 11 and/or network device(s) 2 whose level(s) of priority is lower than that corresponding to the new network device 2C. For example, if the network device 2D has a lower level of priority than the new network device 2C, the redundant power supply 1 will cease to output to the network device 2D the corresponding first electricity (as indicated by the dashed line in FIG. 4).

Figure 6:
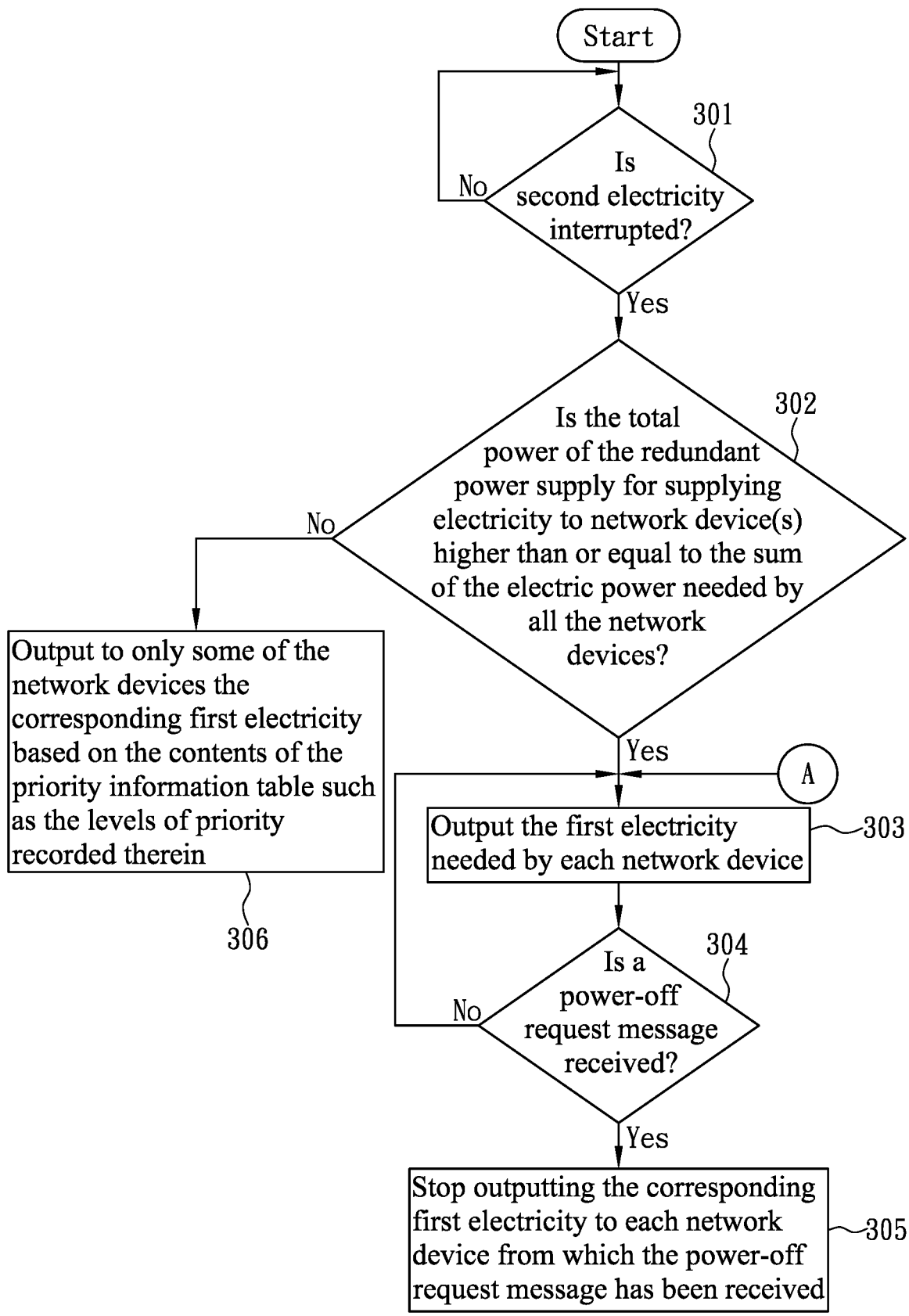
FIG. 6 is a working flowchart of the redundant power supply according to the present disclosure.

The present disclosure further provides a PoE-based redundant power management method. The processing procedures of the redundant power supply 1 involved in the method is detailed as follows with reference to FIG. 6 in conjunction with FIG. 1 and FIG. 2.

Step 301: The redundant power supply 1 determines whether the second electricity E1 is interrupted. In response to determining the second electricity E1 is interrupted, Step 302 is performed. In response to determining the second electricity E1 is not interrupted, the redundant power supply 1 returns to Step 301, that is, the redundant power supply 1 continues determining whether the second electricity E1 is interrupted.

Step 302: The redundant power supply 1 determines whether the total power at which it can supply electricity to the network device(s) 2 is higher than or equal to the sum of the electric power needed by all the network device(s) 2 that are currently connected to the redundant power supply 1. In response to determining the total power at which it can supply electricity to the network device(s) 2 is higher than or equal to the sum of the electric power needed by all the network device(s) 2 that are currently connected to the redundant power supply 1, Step 303 is performed. In response to determining the total power at which it can supply electricity to the network device(s) 2 is lower than the sum of the electric power needed by all the network device(s) 2 that are currently connected to the redundant power supply 1, Step 306 is performed.

Step 303: The redundant power supply 1 outputs to the respective network device(s) 2 the corresponding first electricity needed by the respective network device(s) 2, and then enters Step 304.

Step 304: The redundant power supply 1 determines whether it has received a power-off request message. In response to determining a power-off request message has been received, Step 305 is performed. In response to determining a power-off request message has not been received, return to Step 303.

Step 305: The redundant power supply 1 stops outputting the corresponding first electricity to each network device 2 from which the power-off request message has been received.

Step 306: Based on the contents of the priority information table 153, the redundant power supply 1 sequentially supplies to each network device 2 the corresponding first electricity, in an order of priority level from high to low, until the sum of the electric power of all the outputted first electricity is determined to be about to exceed the total power at which the redundant power supply 1 can supply electricity to the network device(s) 2, the redundant power supply 1 refrains from outputting corresponding first electricity to the remaining network device(s) 2 that has not been supplied with corresponding first electricity.

Figure 7:
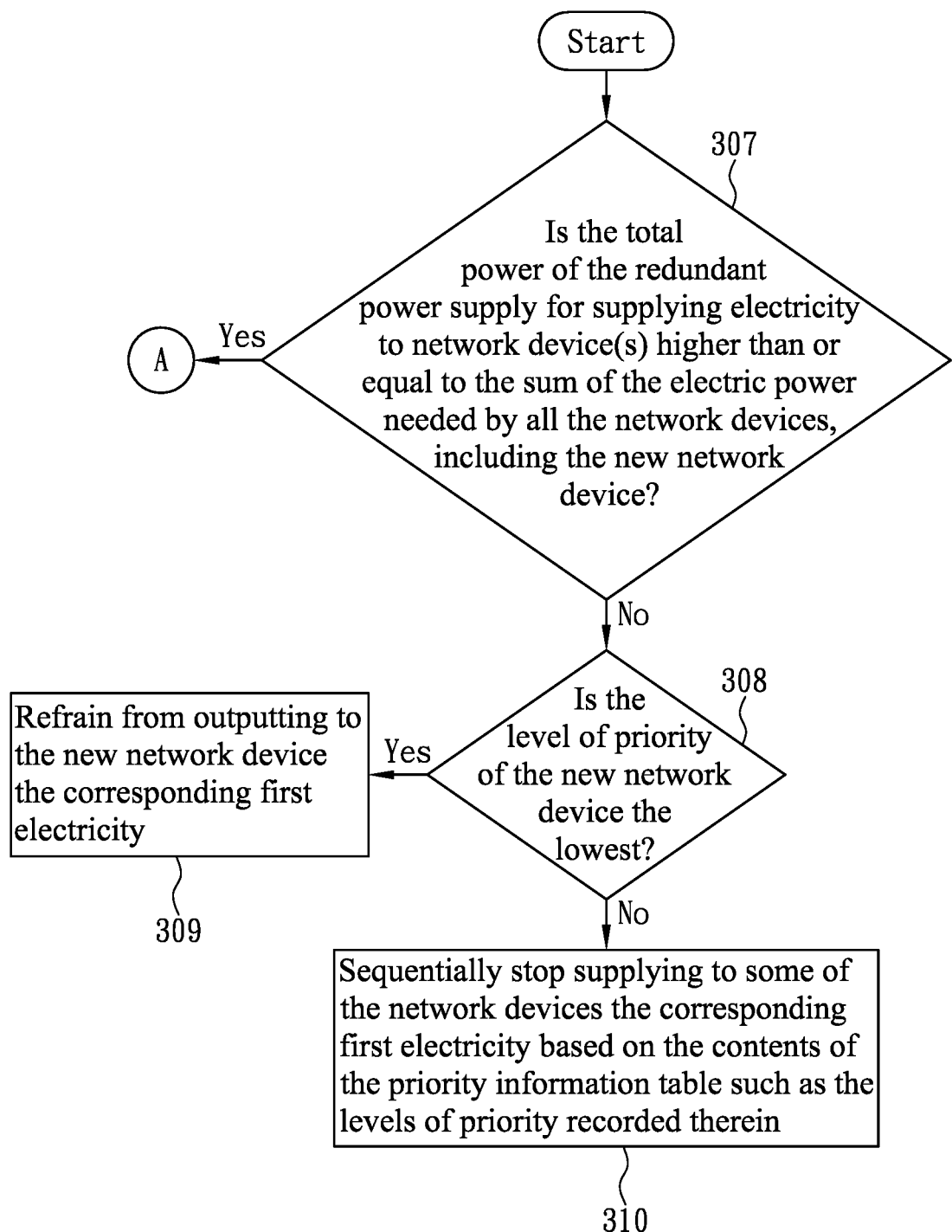
FIG. 7 is a working flowchart of the redundant power supply that has been connected with a new network device.

In continuation of the above, after the Step 301, when a new network device 2 is connected to the redundant power supply 1 and thus enters the online state, referring to FIGS. 1, 2 and 7, the redundant power supply 1 is further configured to execute the following procedures.

Step: 307: The redundant power supply 1 determines whether the total power at which it can supply electricity to the network device(s) 2 is higher than or equal to the sum of the electric power needed by all the network device(s) 2 that are currently connected to the redundant power supply 1 (including the network device(s) 2 already connected to the redundant power supply 1 and the new network device 2). In response to determining the total power at which it can supply electricity to the network device(s) 2 is higher than or equal to the sum of the electric power needed by all the network device(s) 2 that are currently connected to the redundant power supply 1, the redundant power supply 1 enters Step 303, as indicated by the circled A in FIGS. 6 and 7. In response to determining the total power at which it can supply electricity to the network device(s) 2 is lower than the sum of the electric power needed by all the network device(s) 2 that are currently connected to the redundant power supply 1, the redundant power supply 1 enters Step 308.

Step 308: The redundant power supply 1 determines whether the level of priority of the new network device 2 is the lowest. In response to determining the level of priority of the new network device 2 is the lowest, the redundant power supply 1 enters Step 309. In response to determining the level of priority of the new network device 2 is not the lowest, the redundant power supply 1 enters Step 310.

Step 309: The redundant power supply 1 refrains from outputting to the new network device 2 the corresponding first electricity.

Step 310: The redundant power supply 1 sequentially stops supplying electricity to the other network device(s) 2, in an order of priority level from low to high, until the sum of the electric power of all the outputted first electricity is determined as not to exceed the total power at which the redundant power supply 1 can supply electricity to the network device(s) 2.

To increase the safety of use, referring again to FIG. 1, the redundant power supply 1 is further provided with a safety sensing unit 154. In certain embodiments, the safety sensing unit 154 is integrated into the microcontroller 15. However, the present disclosure is not limited thereto. The safety sensing unit 154 is configured to detect the current environmental condition(s) of the redundant power supply 1 (e.g., the overall temperature of the redundant power supply 1, the temperature of the microcontroller 15, and/or the presence of a short circuit in the internal circuit(s) of the redundant power supply 1), and transmit the current environmental condition(s) to the microcontroller 15. If the microcontroller 15 determines that the current environmental condition is abnormal (e.g., a detected temperature exceeds a threshold value, or a short circuit is detected), the microcontroller 15 performs a safety procedure, such as the microcontroller 15 generating a sound alert, stopping its own operation, or sending warning information to the user.

Figure 8:
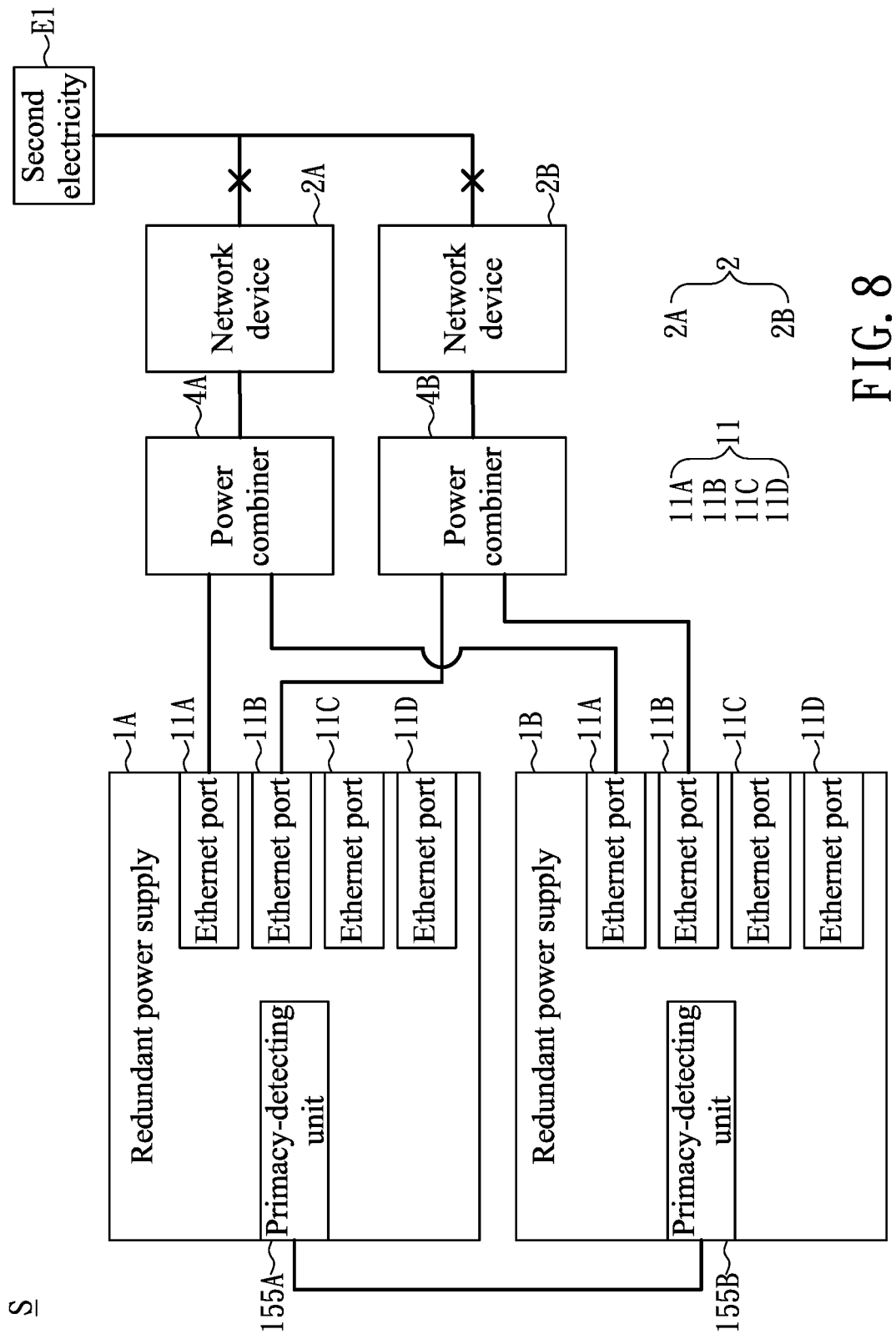
FIG. 8 is a schematic view of a dual redundant backup system according to the present disclosure.

Further, as a single redundant power supply may still malfunction and therefore fail to provide backup electricity when needed, a backup system S may include a plurality of redundant power supplies instead of only one. In FIG. 8, for example, a dual redundant backup system S includes two redundant power supplies 1A and 1B, each provided therein with a primacy-detecting unit 155A, 155B to enable communication between the two redundant power supplies 1A and 1B so as to ascertain which of the redundant power supplies is the primary backup device and which is the secondary backup device. For example, as shown in FIG. 8 (which shows only certain components of the redundant power supplies for the sake of simplicity), the Ethernet ports 11A of the two redundant power supplies 1A and 1B are electrically connected to the network device 2A through a power combiner 4A, and the Ethernet ports 11B of the two redundant power supplies 1A and 1B are electrically connected to the network device 2B through another power combiner 4B. When the redundant power supply 1A functions as the primary backup device, it transmits to the network devices 2A and 2B the respective corresponding first electricity in the event that the network devices 2A and 2B do not receive the second electricity E1. If the redundant power supply 1A malfunctions or fails, the redundant power supply 1B supersedes the redundant power supply 1A, and transmits the respective corresponding first electricity to the network devices 2A and 2B.

In certain embodiments, with continued reference to FIG. 8, at least one of the power combiners 4A and 4B is configured to identify, by a difference in voltage, which of the redundant power supplies 1A and 1B is currently outputting the first electricity, and then relay the first electricity to the network devices 2A and 2B. For example, the Ethernet port 11A of the redundant power supply 1A outputs a standard output voltage, and the Ethernet port 11A of the redundant power supply 1B outputs a standby output voltage, wherein the standby output voltage is lower than the standard output voltage. The foregoing setting of the standard output voltage and of the standby output voltage enables the power combiners 4A and 4B to identify the redundant power supply 1A as the one that is currently outputting, or should be outputting, the first electricity. When the redundant power supply 1A malfunctions, the output voltage of its Ethernet port 11A will drop far below the standby output voltage, so the power combiners 4A and 4B will identify the redundant power supply 1B as the one that is currently outputting, or should be outputting, the first electricity. The primacy-detecting unit 155A may also notify the primacy-detecting unit 155B that the redundant power supply 1A is malfunctioning, in order for the redundant power supply 1B to raise its output voltage to the standard output voltage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power over Ethernet (PoE)-based redundant power management method, applicable on a redundant power supply connectable electrically to a plurality of network devices through a plurality of twisted pairs respectively to transmit first electricity and digital information to each of the network devices, the redundant power supply comprising a plurality of Ethernet ports, a backup power supply unit and a microcontroller provided therein with a priority information table recording a level of priority of each of the Ethernet ports, each of the network devices or each of the Ethernet ports and the network devices, wherein each of the Ethernet ports is electrically connectable to a corresponding one of the network devices through a corresponding one of the twisted pairs so as to enter an online state and transmit the corresponding first electricity and the corresponding digital information to the corresponding network device, the backup power supply unit is electrically connected to each of the Ethernet ports respectively and configured to output the corresponding first electricity to a corresponding one of the Ethernet ports, and the microcontroller is electrically connected to the backup power supply unit and configured to receive a power demand message from each of the network devices so as to be informed of electric power needed by the network device, the method comprising the steps of:

in response to determining, by the microcontroller, that second electricity for at least one of the network devices that is electrically connected to the redundant power supply is interrupted, outputting, by the backup power supply unit, the corresponding first electricity needed by the at least one network device through the corresponding Ethernet port, wherein the corresponding first electricity equals to the electric power needed by the at least one network device;

in response to receiving, by the microcontroller, a power-off request message from the at least one network device, stopping, by the backup power supply unit, outputting the corresponding first electricity to the at least one network device;

in response to determining, by the microcontroller, a new network device is electrically connected to one of the Ethernet ports when the redundant power supply is outputting the first electricity to the at least one network device, reading, by the microcontroller, information of the new network device including electric power needed by and a level of priority of the new network device; and in response to determining, by the microcontroller, total power of the backup power supply unit for supplying electricity to the network devices is lower than a sum of electric power needed by each network device that is electrically connected to the redundant power supply, including the new network device, and the level of priority of the new network device is not the lowest among the at least one network device that is electrically connected to the redundant power supply, the redundant power supply outputting to the new network device the first electricity corresponding to the new network device, and in an order of priority level from low to high sequentially stopping supplying electricity to any of the Ethernet ports and the network devices that is in the online state and has a level of priority lower than the level of priority of the new network device.

2. The method according to claim 1, further comprising:
 in response to determining, by the microcontroller, the total power of the backup power supply unit for supplying electricity to the network devices is lower than the sum of electric power needed by each network device that is electrically connected to the redundant power supply, including the new network device, and the level of priority of the new network device is the lowest among the at least one network device that is electrically connected to the redundant power supply, the redundant power supply refraining from outputting to the new network device the first electricity corresponding to the new network device.

3. The method according to claim 2, wherein the redundant power supply further comprises at least one connection detection unit configured to detect a connection state of each of the Ethernet ports, and to inform the microcontroller of the connection state so that the backup power supply unit does not output electricity to any of the Ethernet ports that is currently in an offline state.

4. The method according to claim 1, wherein the redundant power supply further comprises at least one connection detection unit configured to detect a connection state of each of the Ethernet ports, and to inform the microcontroller of the connection state so that the backup power supply unit does not output electricity to any of the Ethernet ports that is currently in an offline state.

5. The method according to claim 3, wherein the redundant power supply further comprises a safety sensing unit configured to detect a current environmental condition of the redundant power supply and to inform the microcontroller of the current environmental condition, and the method further includes, in response to determining, by the microcontroller, the current environmental condition is abnormal, performing, by the microcontroller, a safety procedure.

6. The method according to claim 4, wherein the redundant power supply further comprises a safety sensing unit configured to detect a current environmental condition of the redundant power supply and to inform the microcontroller of the current environmental condition, and the method further includes, in response to determining, by the microcontroller, the current environmental condition is abnormal, performing, by the microcontroller, a safety procedure.

7. The method according to claim 3, wherein the redundant power supply is provided with a primacy-detecting unit, is electrically connectable to at least one of the network devices through a power combiner, and is configured to communicate, through the primacy-detecting unit, with another redundant power supply that is connectable to the at least one network device through the power combiner, and identify the redundant power supply as a primary backup device or a secondary backup device based on the communication; the power combiner is configured to identify, by a difference in voltage, which of the redundant power supply and the another redundant power supply is currently supplying the corresponding first electricity to the corresponding network device, and relay the corresponding first electricity to the corresponding network device; and the method further includes supplying, by the secondary backup device, the corresponding first electricity to the corresponding network device when the primary backup device is unable to supply the corresponding first electricity to the corresponding network device.

8. The method according to claim 4, wherein the redundant power supply is provided with a primacy-detecting unit, is electrically connectable to at least one of the network devices through a power combiner, and is configured to communicate, through the primacy-detecting unit, with another redundant power supply that is connectable to the at least one network device through the power combiner, and identify the redundant power supply as a primary backup device or a secondary backup device based on the communication; the power combiner is configured to identify, by a difference in voltage, which of the redundant power supply and the another redundant power supply is currently supplying the corresponding first electricity to the corresponding network device, and relay the corresponding first electricity to the corresponding network device; and the method further includes supplying, by the secondary backup device, the corresponding first electricity to the corresponding network device when the primary backup device is unable to supply the corresponding first electricity to the corresponding network device.

9. A redundant power supply for Power over Ethernet (PoE)-based redundant power management, connectable electrically to a plurality of network devices through a plurality of twisted pairs respectively to transmit first electricity and digital information to each of the network devices, and comprising:
- a plurality of Ethernet ports, each electrically connectable to a corresponding one of the network devices through a corresponding one of the twisted pairs so as to enter an online state, and configured to transmit the corresponding first electricity and the corresponding digital information to the corresponding network device, and receive a power demand message from the network device;
- a backup power supply unit electrically connected to each of the Ethernet ports respectively and configured to output the corresponding first electricity to a corresponding one of the Ethernet ports; and
- a microcontroller electrically connected to the backup power supply unit, provided therein with a priority information table recording a level of priority of each of the Ethernet ports, each of the network devices, or each of the Ethernet ports and the network devices, and configured to:
  - receive the power demand message so as to be informed of electric power needed by the network device;
  - in response to determining, by the microcontroller, that second electricity for at least one of the network devices that is electrically connected to the redundant power supply is interrupted, instruct the backup power supply unit to output the corresponding first electricity needed by the at least one network device through the corresponding Ethernet port, wherein the corresponding first electricity equals to the electric power needed by the at least one network device;
  - in response to receiving, by the microcontroller, a power-off request message from the at least one network device, stop outputting the corresponding first electricity to the at least one network device; and
  - in response to determining, by the microcontroller, a new network device is electrically connected to one of the Ethernet ports when the redundant power supply is outputting the first electricity to the at least one of the network devices, read information of the new network device that includes electric power needed by and a level of priority of the new network device, wherein the redundant power supply is further configured to, in response to determining, by the microcontroller, total power of the backup power supply unit for supplying electricity to the network devices is lower than a sum of electric power needed by each network device that is electrically connected to the redundant power supply, including the new network device, and the level of priority of the new network device is not the lowest among the at least one network device that is electrically connected to the redundant power supply, output to the new network device first electricity corresponding to the new network device, and in an order of priority level from low to high, sequentially stop supplying electricity to any of the Ethernet ports and the network devices that is in the online state and has a level of priority lower than the level of priority of the new network device.

10. The redundant power supply according to claim 9, further configured to, in response to determining, by the microcontroller, the total power of the backup power supply unit for supplying electricity to the network devices is lower than the sum of electric power needed by each network device that is electrically connected to the redundant power supply, including the new network device, and the level of priority of the new network device is the lowest among the at least one network device that is electrically connected to the redundant power supply, refrain from outputting to the new network device the first electricity corresponding to the new network device.

11. The redundant power supply according to claim 10, further configured to receive an external alternating-current (AC) power source and an external direct-current (DC) power source, wherein the backup power supply unit comprises:
- an electricity distribution portion configured to distribute among the Ethernet ports electric power needed by each of the Ethernet ports;
- a power pool electrically connected to the electricity distribution portion;
- an AC-DC conversion circuit configured to receive AC electricity transmitted from the AC power source, convert the AC electricity received into DC electricity, and output the DC electricity to the power pool; and
- a DC regulation circuit configured to receive the DC electricity transmitted from the DC power source, increase or decrease voltage of the DC electricity received, and output resulting DC electricity to the power pool.

12. The redundant power supply according to claim 9, further configured to receive an external alternating-current (AC) power source and an external direct-current (DC) power source, wherein the backup power supply unit comprises:
- an electricity distribution portion configured to distribute among the Ethernet ports electric power needed by each of the Ethernet ports;
- a power pool electrically connected to the electricity distribution portion;
- an AC-DC conversion circuit configured to receive AC electricity transmitted from the AC power source, convert the AC electricity received into DC electricity, and output the DC electricity to the power pool; and
- a DC regulation circuit configured to receive the DC electricity transmitted from the DC power source, increase or decrease voltage of the DC electricity received, and output resulting DC electricity to the power pool.

13. The redundant power supply according to claim 11, further comprising at least one connection detection unit configured to detect a connection state of each of the Ethernet ports, and to inform the microcontroller of the connection state so that the backup power supply unit does not output electricity to any of the Ethernet ports that is currently in an offline state.

14. The redundant power supply according to claim 12, further comprising at least one connection detection unit configured to detect a connection state of each of the Ethernet ports, and to inform the microcontroller of the connection state so that the backup power supply unit does not output electricity to any of the Ethernet ports that is currently in an offline state.

15. The redundant power supply according to claim 13, further comprising a safety sensing unit configured to detect a current environmental condition of the redundant power supply and to inform the microcontroller of the current environmental condition, wherein the microcontroller is further configured to, in response to determining, by the microcontroller, the current environmental condition is abnormal, perform, by the microcontroller, a safety procedure.

16. The redundant power supply according to claim 14, further comprising a safety sensing unit configured to detect a current environmental condition of the redundant power supply and to inform the microcontroller of the current environmental condition, wherein the microcontroller is further configured to, in response to determining, by the microcontroller, the current environmental condition is abnormal, perform, by the microcontroller, a safety procedure.

17. The redundant power supply according to claim 13, further comprising a primacy-detecting unit, and further configured to communicate, through the primacy-detecting unit, with another redundant power supply to identify the redundant power supply as a primary backup device or a secondary backup device based on the communication.

18. The redundant power supply according to claim 14, further comprising a primacy-detecting unit, and further configured to communicate, through the primacy-detecting unit, with another redundant power supply to identify the redundant power supply as a primary backup device or a secondary backup device based on the communication.

19. A power over Ethernet (PoE)-based redundant power management method, applicable on a redundant power supply connectable electrically to a plurality of network devices through a plurality of twisted pairs respectively to transmit first electricity and digital information to each of the network devices, the redundant power supply comprising a plurality of Ethernet ports, a backup power supply unit, a microcontroller provided therein with a priority information table recording a level of priority of each of the Ethernet ports, each of the network devices or each of the Ethernet ports and the network devices, at least one connection detection unit configured to detect a connection state of each of the Ethernet ports, and to inform the microcontroller of the connection state so that the backup power supply unit does not output electricity to any of the Ethernet ports that is currently in an offline state, and a safety sensing unit configured to detect a current environmental condition of the redundant power supply and to inform the microcontroller of the current environmental condition, wherein each of the Ethernet ports is electrically connectable to a corresponding one of the network devices through a corresponding one of the twisted pairs so as to enter an online state and transmit the corresponding first electricity and the corresponding digital information to the corresponding network device, the backup power supply unit is electrically connected to each of the Ethernet ports respectively and configured to output the corresponding first electricity to a corresponding one of the Ethernet ports, and the microcontroller is electrically connected to the backup power supply unit and configured to receive a power demand message from each of the network devices so as to be informed of electric power needed by the network device, the method comprising the steps of:

in response to determining, by the microcontroller, that second electricity for at least one of the network devices that is electrically connected to the redundant power supply is interrupted, outputting, by the backup power supply unit, the corresponding first electricity needed by the at least one network device through the corresponding Ethernet port, wherein the corresponding first electricity equals to the electric power needed by the at least one network device;

in response to receiving, by the microcontroller, a power-off request message from the at least one network device, stopping, by the backup power supply unit, outputting the corresponding first electricity to the at least one network device;

in response to determining, by the microcontroller, a new network device is electrically connected to one of the Ethernet ports when the redundant power supply is outputting the first electricity to the at least one network device, reading, by the microcontroller, information of the new network device including electric power needed by and a level of priority of the new network device;

in response to determining, by the microcontroller, total power of the backup power supply unit for supplying electricity to the network devices is lower than a sum of electric power needed by each network device that is electrically connected to the redundant power supply, including the new network device, and the level of priority of the new network device is the lowest among the at least one network device that is electrically connected to the redundant power supply, the redundant power supply refraining from outputting to the new network device the first electricity corresponding to the new network device; and in response to determining, by the microcontroller, the current environmental condition is abnormal, performing, by the microcontroller, a safety procedure.

20. A power over Ethernet (PoE)-based redundant power management method, applicable on a redundant power supply connectable electrically to a plurality of network devices through a plurality of twisted pairs respectively to transmit first electricity and digital information to each of the network devices, and connectable electrically to at least one of the network devices through a power combiner, the redundant power supply comprising a plurality of Ethernet ports, a backup power supply unit, a primacy-detecting unit, a microcontroller provided therein with a priority information table recording a level of priority of each of the Ethernet ports, each of the network devices or each of the Ethernet ports and the network devices, and at least one connection detection unit configured to detect a connection state of each of the Ethernet ports, and to inform the microcontroller of the connection state so that the backup power supply unit does not output electricity to any of the Ethernet ports that is currently in an offline state, wherein each of the Ethernet ports is electrically connectable to a corresponding one of the network devices through a corresponding one of the twisted pairs so as to enter an online state and transmit the corresponding first electricity and the corresponding digital information to the corresponding network device, the backup power supply unit is electrically connected to each of the Ethernet ports respectively and configured to output the corresponding first electricity to a corresponding one of the Ethernet ports, and the microcontroller is electrically connected to the backup power supply unit and configured to receive a power demand message from each of the network devices so as to be informed of electric power needed by the network device; the redundant power supply being configured to communicate, through the primacy-detecting unit, with another redundant power supply that is connectable to the at least one network device through the power combiner, and identify the redundant power supply as a primary backup device or a secondary backup device based on the communication; the power combiner being configured to identify, by a difference in voltage, which of the redundant power supply and the another redundant power supply is currently supplying the corresponding first electricity to the corresponding network device, and relay the corresponding first electricity to the corresponding network device; and the method comprising the steps of:

in response to determining, by the microcontroller, that second electricity for at least one of the network devices that is electrically connected to the redundant power supply is interrupted, outputting, by the backup power supply unit, the corresponding first electricity needed by the at least one network device electrically connected to the redundant power supply through the corresponding Ethernet port, wherein the corresponding first electricity equals to the electric power needed by the at least one network device electrically connected to the redundant power supply;

in response to receiving, by the microcontroller, a power-off request message from the at least one network device electrically connected to the redundant power supply, stopping, by the backup power supply unit, outputting the corresponding first electricity to the at least one network device electrically connected to the redundant power supply;

in response to determining, by the microcontroller, a new network device is electrically connected to one of the Ethernet ports when the redundant power supply is outputting the first electricity to the at least one network device electrically connected to the redundant power supply, reading, by the microcontroller, information of the new network device including electric power needed by and a level of priority of the new network device;

in response to determining, by the microcontroller, total power of the backup power supply unit for supplying electricity to the network devices is lower than a sum of electric power needed by each network device that is electrically connected to the redundant power supply, including the new network device, and the level of priority of the new network device is the lowest among the at least one network device that is electrically connected to the redundant power supply, the redundant power supply refraining from outputting to the new network device the first electricity corresponding to the new network device; and supplying, by the secondary backup device, the corresponding first electricity to the corresponding network device when the primary backup device is unable to supply the corresponding first electricity to the corresponding network device.

21. A redundant power supply for Power over Ethernet (PoE)-based redundant power management, connectable electrically to a plurality of network devices through a plurality of twisted pairs respectively to transmit first electricity and digital information to each of the network devices, configured to receive an external alternating-current (AC) power source and an external direct-current (DC) power source, and comprising:

a plurality of Ethernet ports, each electrically connectable to a corresponding one of the network devices through a corresponding one of the twisted pairs so as to enter an online state, and configured to transmit the corresponding first electricity and the corresponding digital information to the corresponding network device, and receive a power demand message from the network device;

a backup power supply unit electrically connected to each of the Ethernet ports respectively and configured to output the corresponding first electricity to a corresponding one of the Ethernet ports, the backup power supply unit comprising:

an electricity distribution portion configured to distribute among the Ethernet ports electric power needed by each of the Ethernet ports;

a power pool electrically connected to the electricity distribution portion;

an AC-DC conversion circuit configured to receive AC electricity transmitted from the AC power source, convert the AC electricity received into DC electricity, and output the DC electricity to the power pool; and a DC regulation circuit configured to receive the DC electricity transmitted from the DC power source, increase or decrease voltage of the DC electricity received, and output resulting DC electricity to the power pool; and a microcontroller electrically connected to the backup power supply unit, provided therein with a priority information table recording a level of priority of each of the Ethernet ports, each of the network devices, or each of the Ethernet ports and the network devices, and configured to:

receive the power demand message so as to be informed of electric power needed by the network device;

in response to determining, by the microcontroller, that second electricity for at least one of the network devices that is electrically connected to the redundant power supply is interrupted, instruct the backup power supply unit to output the corresponding first electricity needed by the at least one network device through the corresponding Ethernet port, wherein the corresponding first electricity equals to the electric power needed by the at least one network device;

in response to receiving, by the microcontroller, a power-off request message from the at least one network device, stop outputting the corresponding first electricity to the at least one network device; and in response to determining, by the microcontroller, a new network device is electrically connected to one of the Ethernet ports when the redundant power supply is outputting the first electricity to the at least one of the network devices, read information of the new network device that includes electric power needed by and a level of priority of the new network device, wherein the redundant power supply is further configured to, in response to determining, by the microcontroller, total power of the backup power supply unit for supplying electricity to the network devices is lower than a sum of electric power needed by each network device that is electrically connected to the redundant power supply, including the new network device, and the level of priority of the new network device is the lowest among the at least one network device that is electrically connected to the redundant power supply, refrain from outputting to the new network device the first electricity corresponding to the new network device.

22. The redundant power supply according to claim 21, further comprising at least one connection detection unit configured to detect a connection state of each of the Ethernet ports, and to inform the microcontroller of the connection state so that the backup power supply unit does not output electricity to any of the Ethernet ports that is currently in an offline state.

23. The redundant power supply according to claim 22, further comprising a safety sensing unit configured to detect a current environmental condition of the redundant power supply and to inform the microcontroller of the current environmental condition, wherein the microcontroller is further configured to, in response to determining, by the microcontroller, the current environmental condition is abnormal, perform, by the microcontroller, a safety procedure.

24. The redundant power supply according to claim 22, further comprising a primacy-detecting unit, and further configured to communicate, through the primacy-detecting unit, with another redundant power supply to identify the redundant power supply as a primary backup device or a secondary backup device based on the communication.

* * * * *